United States Patent
Griffin

(10) Patent No.: US 9,686,342 B2
(45) Date of Patent: Jun. 20, 2017

(54) GENERATING A TAILORED SCHEMA DESCRIPTION OF A WEB SERVICE

(71) Applicant: International Business Machines Corporation, Armonk, NY (US)

(72) Inventor: Catherine Griffin, Stockbridge (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 620 days.

(21) Appl. No.: 13/836,302

(22) Filed: Mar. 15, 2013

(65) Prior Publication Data

US 2014/0122679 A1 May 1, 2014

(30) Foreign Application Priority Data

Oct. 29, 2012 (GB) .................................. 1219369.4

(51) Int. Cl.
*G06F 15/173* (2006.01)
*H04L 29/08* (2006.01)
*G06F 17/30* (2006.01)

(52) U.S. Cl.
CPC .......... *H04L 67/02* (2013.01); *G06F 17/3089* (2013.01); *H04L 67/16* (2013.01)

(58) Field of Classification Search
CPC ...... G06F 17/3089; H04L 67/02; H04L 67/16
USPC ........ 709/220, 221, 222, 223, 226, 229, 230
See application file for complete search history.

(56) References Cited

U.S. PATENT DOCUMENTS

| 7,657,868 | B2 | 2/2010 | Shenfield et al. |
| 7,877,725 | B2* | 1/2011 | Vitanov et al. ................ 717/106 |
| 2006/0218102 | A1* | 9/2006 | Gibson et al. .................. 705/80 |
| 2008/0294712 | A1 | 11/2008 | Lu et al. |
| 2010/0094913 | A1* | 4/2010 | Connor et al. ................ 707/803 |
| 2010/0235725 | A1* | 9/2010 | Drayton et al. .............. 715/234 |
| 2010/0318370 | A1 | 12/2010 | Bhattacharyya et al. |
| 2011/0270895 | A1* | 11/2011 | Shelby ......................... 707/803 |
| 2012/0271748 | A1* | 10/2012 | DiSalvo ................. G06Q 40/04 705/37 |

(Continued)

OTHER PUBLICATIONS

IBM InfoSphere Master Data Management Server, Version 10.0; [online]; [retrieved on Jan. 17. 2012]; retrieved from the Internet http://publib.boulder.ibm.com/infocenter.mdm/v1OrOm/topic/com.ibm . . . ; IBM Corp., "InfoSphere MDM architectural Overview," 2011, pp. 1-2.

(Continued)

*Primary Examiner* — Davoud Zand
(74) *Attorney, Agent, or Firm* — Cantor Colburn LLP; Robert Bunker

(57) ABSTRACT

Embodiments relate to a method, computer program product, and a computer system for generating a tailored schema description of a web service from a predefined schema description of the web service is provided. The predefined schema provides a machine readable description of operations performed by the web service and a message format for communication with the web service. A subset of the predefined schema required to support an identified operation may be calculated based on at least one example message. A tailored schema may then be generated based on the calculated subset of the predefined schema.

17 Claims, 5 Drawing Sheets

(56) References Cited

U.S. PATENT DOCUMENTS

| | | | | |
|---|---|---|---|---|
| 2013/0060655 A1* | 3/2013 | Trounce | ............ | G06Q 30/0621 |
| | | | | 705/26.5 |
| 2013/0179982 A1* | 7/2013 | Bridges | ............... | H04L 63/0823 |
| | | | | 726/26 |
| 2014/0310243 A1* | 10/2014 | McGee | ............ | G06F 17/30575 |
| | | | | 707/639 |

OTHER PUBLICATIONS

C. Weyer et al; "Schema-Based Development with Windows Communication Foundation;" MSDN Magazine; Issues and Downloads; Oct. 2009; 10 pages.

IBM InfoSphere Master Data Management Server, Version 10.0; [online]; [retrieved on Dec. 11, 2012]; retrieved from the Internet http://publib.boulder.ibm.com/infocentermdm/v1OrOm/topic/com.ibm . . . ; IBM Corp., "Tailoring the InfoSphere MDM Server Web Service Interfaces," 2011, pp. 1-2.

\* cited by examiner

GENERATING A TAILORED SCHEMA DESCRIPTION OF A WEB SERVICE

PRIORITY

This application claims priority to Great Britain Patent Application No. 1219369.4, filed 29 Oct. 2012, and all the benefits accruing therefrom under 35 U.S.C. §119, the contents of which in its entirety are herein incorporated by reference.

BACKGROUND

This disclosure relates to computer software applications, and more particularly web-based computer software applications known as web services.

Web services are web-based computer software applications which interact with other applications, such as other web services or client applications. Web services may be made publicly available or may be deployed in private environments, such as within a private organization to enable divisions and/or subsidiaries to exchange data. Applications may search for a description of a service and, once an appropriate service is found, may interact with it, such as to complete a fee-based transaction.

Communication with a web service is accomplished via messages. Specifically, in order to invoke a function provided by a web service, an application typically transmits a "request" message, in a predefined format specified by the web service, to an appropriate endpoint. Upon processing information included in the message, the web service may transmit a "response" message to the application, which also has a predefined format specified by the web service.

A web service description document defines characteristics of a web service, including the functions or operations it provides, the format of request and response messages, the communication protocols it employs, and other features (including behaviors and rules, for example). Thus, a web service description document provides a machine-readable description (otherwise referred to as a schema) of a web service to an application. Web service description documents may be developed, for example, in the web service description language (WSDL), the simple object access protocol (SOAP) Service Description Language (SSDL), or any other suitable description language.

The WSDL is an extensible markup language (XML) based language used for describing the functionality offered by a web service. A WSDL description of a web service (otherwise referred to as a WSDL document) therefore provides a machine-readable definition of the format of a particular message in the form of an XML Schema. The XML Schema may be incorporated within the WSDL document itself, or may be defined by a separate XML Schema Document (XSD).

A web service description document may also define a binding, or communication protocol, used by the web service to receive and/or transmit messages. For example, a description document may specify that a web service employs the SOAP, Hypertext Transfer Protocol (HTTP), Simple Mail Transfer Protocol (SMTP), or any other communication protocol.

Thus, by way of example, WSDL can be used in combination with SOAP and an XML Schema to provide web services over the Internet. A client application connecting to a web service can read the WSDL document to determine what operations are available, and any special data types used by the web service are described in the form of an XML Schema (which may or may not be embedded in the WSDL document). The client application can then use SOAP to actually call one of the operations listed in the WSDL document using XML or HTTP.

The schemas used (in WSDL and XSD documents, for example) to describe a web service may be very large and complex (due to large and complex inter-related data records being employed for example). In practice, each client may only employ subset of the possible data, and therefore only use a subset of the message schema. Also, different clients may employ different subsets. Thus, when clients want to use a web service, they must typically use a message schema which is far more complex than is actually required for their individual requirements.

It is known to provide a software tool that allows a client customer to "tailor" or edit the message schema. Essentially, WSDL & XSD documents/files can be edited to remove content that a user is not interested in using. The tailored/edited documents/files can then be used instead of the original WSDL & XSD documents/files, so that the client has exactly the required interface and nothing irrelevant.

A screenshot of such a conventional software tool for editing a message schema is shown in FIG. 1. Using the software tool, a user first selects the web service operations that are required (none are included by default). This is a simple task. The software tool then calculates the subset of the full message schema required to support those operations. If required, the user may then undertake the additional task of trimming out unwanted portions of the tailored message schema. This is somewhat complex if the user is aiming for a small subset. It will be appreciated that the conventional software tool assists a user with parts of the task that can be automated, but there is still a lot of possible message data that the user has to think about.

A known alternative approach to generating a tailored message schema is to start with an empty or minimal message schema and have a user add only the required content. However, this places onerous technical requirements on the user, especially for cases where the user wants to add more than a few message elements.

SUMMARY

According to an embodiment, a method of generating a tailored schema description of a web service from a predefined schema description of the web service is disclosed. The predefined schema provides a machine readable description of operations performed by the web service and a message format for communication with the web service. The method includes identifying an operation of the web service to be supported by the tailored schema. The method includes for the identified operation, providing at least one example message. The method includes calculating a subset of the predefined schema for supporting the identified operation based on the at least one example message. The method includes generating the tailored schema based on the calculated subset of the predefined schema.

In yet another embodiment, a computer program product for generating a tailored schema description of a web service from a predefined schema description of the web service is provided. The predefined schema provides a machine readable description of operations performed by the web service and a message format for communication with the web service. The computer program product comprises a computer-readable storage medium having computer-readable program code embodied therewith. The computer-readable program code is configured to perform a method of identifying an operation of the web service to be supported by the tailored schema. The method includes for the identified operation, providing at least one example message. The method includes calculating a subset of the predefined schema for supporting the identified operation based on the at least one example message. The method includes generating the tailored schema based on the calculated subset of the predefined schema.

In another embodiment, a system to generate a tailored schema description of a web service from a predefined schema description of the web service is provided. The system generates a tailored schema description of a web service from a predefined schema description of the web service. The predefined schema provides a machine readable description of operations performed by the web service and a message format for communication with the web service. The system also includes one or more processors configured to perform a method comprising identifying an operation of the web service to be supported by the tailored schema. The method includes for the identified operation, providing at least one example message. The method includes calculating a subset of the predefined schema for supporting the identified operation based on the at least one example message. The method includes generating the tailored schema based on the calculated subset of the predefined schema.

BRIEF DESCRIPTION OF THE SEVERAL VIEWS OF THE DRAWINGS

Embodiments of the present disclosure will now be described, by way of example only, with reference to the following drawings in which.

DETAILED DESCRIPTION

Embodiments provide a simplified approach to creating a tailored schema description of a web service. As an alternative to, or additional to, supporting a user in editing a schema, embodiments may calculate the subset of an existing schema that is required to support one or more web service operations desired by the user. By calculating the required subset based on example messages provided by the user, embodiments can ensure that required message elements are not omitted.

Figure 1:
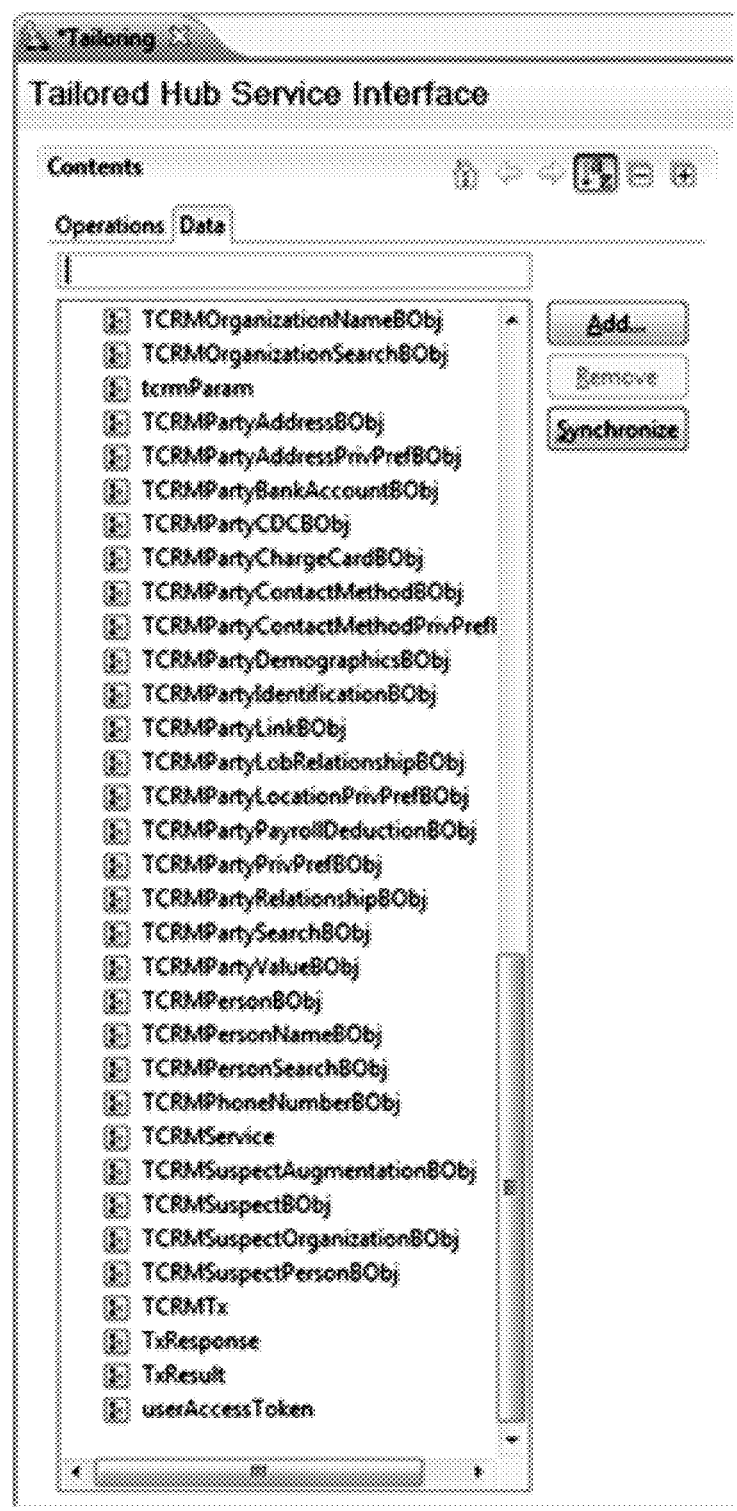
FIG. 1 is a screenshot of a conventional software tool for editing a schema description of a web service.
Figure 2:
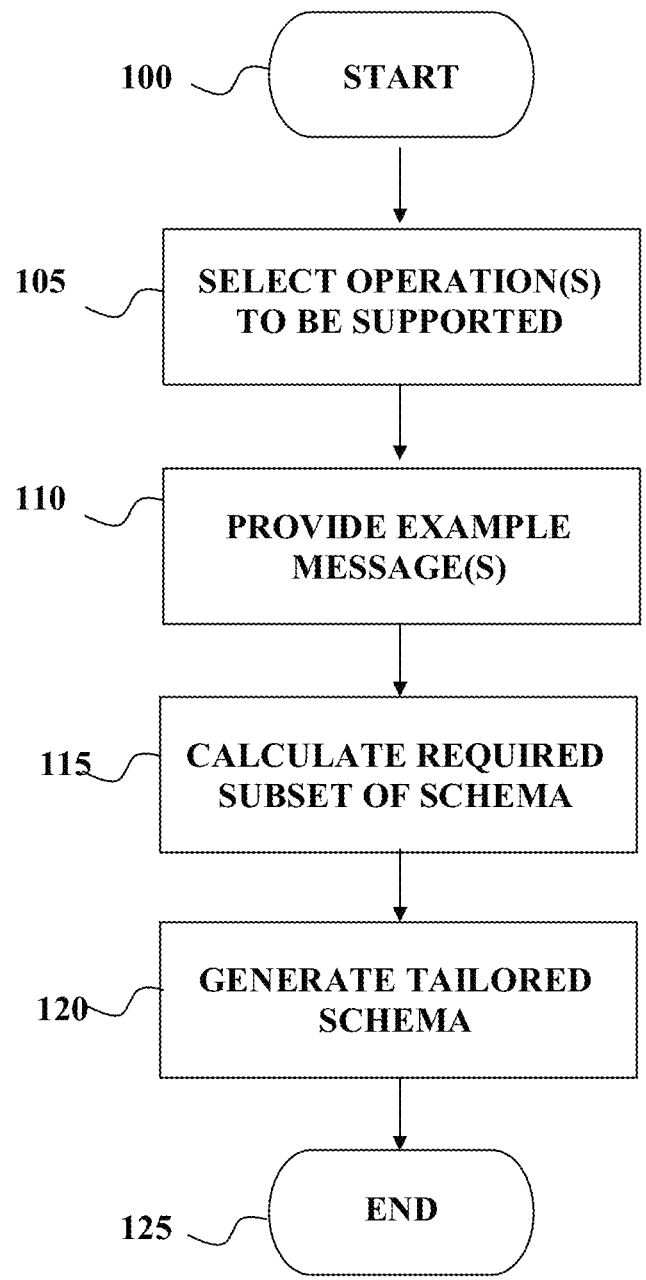
FIG. 2 is a flow diagram of a method of generating a tailored schema description of a web service from a predefined schema according to an embodiment.

Referring to FIG. 2, there is shown a flow diagram of a method of generating a customized or user-specific schema description of a web service according to an embodiment.

The method starts in block 100 and proceeds to block 105 in which the user selects one or more operations to be supported from a list of all operations provided by the web service. The list of all operations is provided from the predefined schema description for the web service. Here, the predefined schema is a machine readable description of the operations performed by the web service and the message format(s) used for communication with the web service. More specifically, in this embodiment, the predefined schema is defined by a WSDL file and an accompanying XSD file, although it is to be appreciated that any other suitable description language and accompanying documents or files may be used to define the predefined schema.

It will be understood that, as a result of block 105, the operations that are desired by the user to be supported (by the tailored schema) have been identified.

Next, in block 110, the user provides at least one example message for each identified operation. More specifically, for each selected operation, the user provides example XML-based request and response messages which contain all the required data fields.

In block 115, the user-provided examples are analyzed to determine a minimal subset of the predefined schema that will support the user-provided example messages. In this example, this is done by firstly marking all elements of the predefined schema as 'unused', and then parsing each XML message example to identify, for each element in the message, the corresponding required schema element(s). The schema element(s) identified as being required are then marked as 'used'. The subset is then determined by removing all the elements from the schema that are still marked as 'unused', thus only leaving the required elements.

The tailored or custom schema is then created from the determined subset in block 120. This custom schema is defined by a WSDL file and an accompanying XSD file, and it will be understood that the custom schema is a subset of the original WSDL and XSD files used for the predefined schema. The method then ends in block 125.

Here, the described embodiment does not support renaming or reordering elements or changing them in any way from the original definition(s) in the original WDSL and XSD files. This makes the analysis and construction of the custom schema more straightforward.

Figure 3:
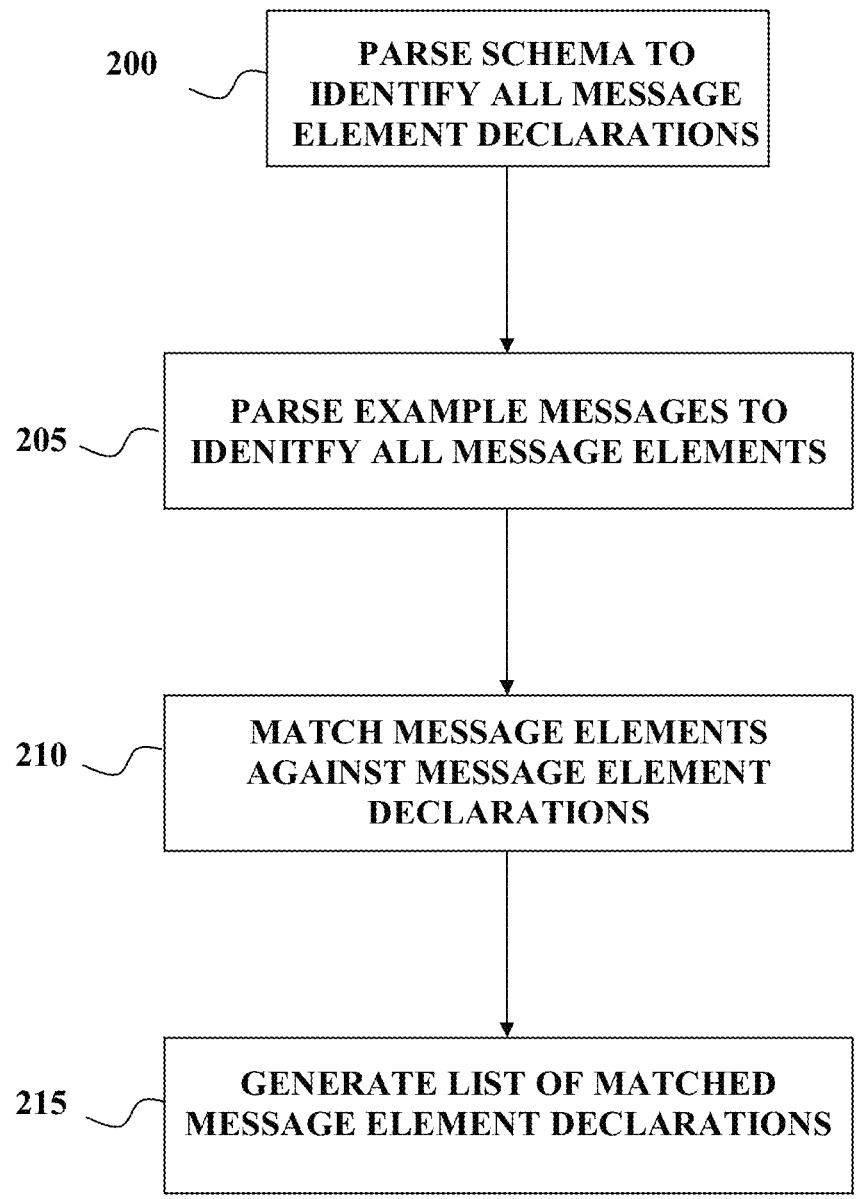
FIG. 3 shows a flow diagram of calculating a required subset of a schema according to another embodiment.

Turning now to FIG. 3, there is shown a flow diagram of a method of determining a required subset of a schema according to another embodiment. Thus, the FIG. 3 shows an alternative to block 115 of the embodiment described above (and shown in FIG. 2).

Firstly, in block 200, the original WSDL and XML schema is parsed to identify all message element declarations of the schema. All of the identified message element declarations may be stored as a list, D, for example.

Next, in block 205, for each operation to be supported by the tailored schema, each example XML message to be supported by the operation is parsed and the message elements contained therein identified.

Each message element is then matched against a message element declaration of the list D in block 210. The matched message element declarations are added to a list S in block 215. The list S thus details message element declarations of the schema that are required by the operation(s) to be supported by the tailored schema.

Using the list S, the tailored schema can then be generated by removing all the elements from the schema that are not needed (i.e. those not in the list S), thus only leaving the required elements.

By way of example, WSDL & XML schema files for the tailored schema can be generated by first creating a copy of the original WSDL & XML schema files and then deleting from the WSDL file all operations, message definitions and PortType definitions which are not required, and deleting from the XML schema file all element declarations which are not in the set S and all type declarations which are not referenced by any element declaration or message definition.

Figure 4:
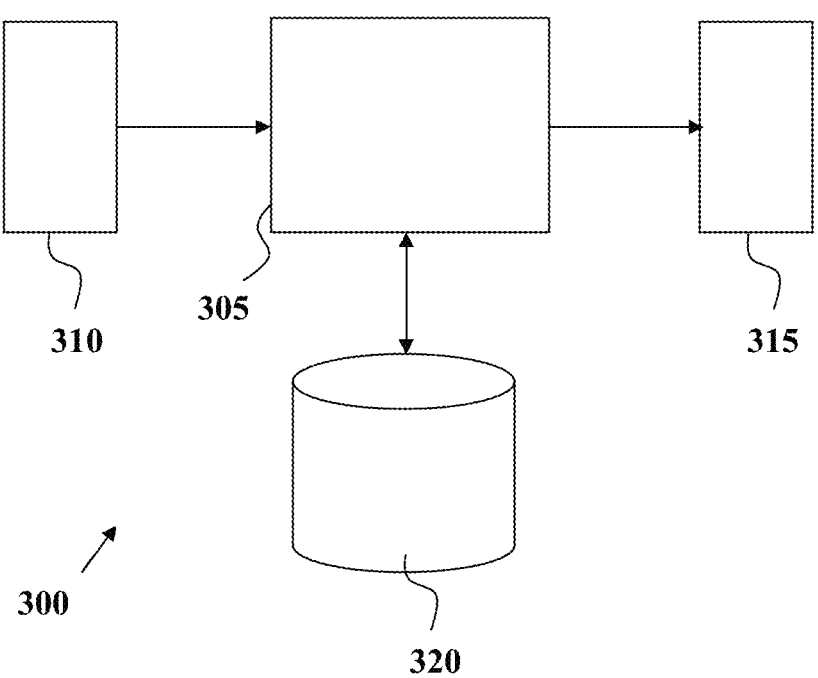
FIG. 4 illustrates a schematic block diagram of a system according to an embodiment.

Referring now to FIG. 4, there is illustrated a schematic block diagram of a system 300 according to an embodiment.

The system 300 is adapted to generate a customized schema description of a web service from a predetermined schema description of the web service. The system comprises a processing unit 305 having input 310 and output 315 interfaces, and a data storage unit 320 connected to the processing unit 305.

The input 310 interface is adapted to receive inputs and/or instructions from user, and the output interface 315 is adapted to provide information (such as a generated customized schema, for example) from the processing unit 305 to the user.

The data storage unit is adapted to store one or more machine readable descriptions of operations performed by one or more web services. In other words, the data storage unit 320 is adapted to store one or more schemas (as WSDL and XSD files, for example).

The processing unit 305 is adapted to execute a computer program which, when executed, causes the system to implement the method according to an embodiment, for example the method as shown in FIG. 2.

The processing unit 305 is adapted to receive, via the input interface 310, an indication of a schema to customize. Based on this indication, the processing unit 305 checks if the schema is stored in the data storage unit. If the schema is not stored, the processing unit prompts the user (via the output interface) to supply the schema. The user may then input the schema (i.e. a machine readable description of the web service) via the input interface 310 for use by the processing unit 305 and/or storage in the data storage unit 320.

The processor 305 is also adapted to receive, via the input interface 310, a user indication of an operation of the web service to be supported by the customized schema, along with at least one example message. Using such user-supplied information, the processor 305 calculates a subset of the schema that is required to support the identified operation. More specifically, the processor analyses the example message(s) supplied by the user in conjunction with the schema to determine which schema elements are required. The processor 305 then edits the schema to only contain the schema elements that have been determined as being required, thus removing the schema elements that are not required. The edited schema is provided from the processor 305 to the user via the output interface 315. Thus, the processor 305 is adapted to create a customized schema from an existing schema by editing the schema to only contain elements that are required in order to support user-selected operations.

Figure 5:
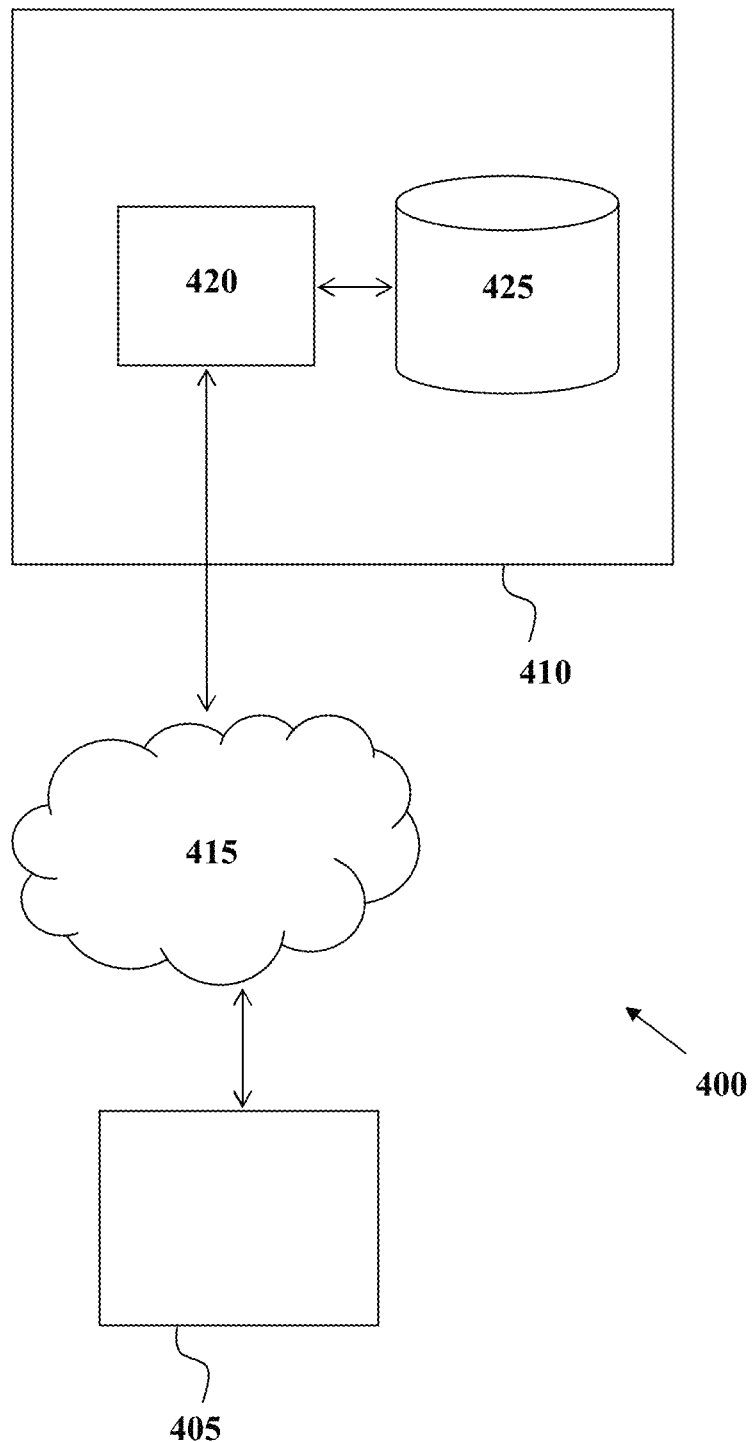
FIG. 5 illustrates a schematic block diagram of a system according to another embodiment.

Referring now to FIG. 5, there is illustrated a schematic block diagram of a system 400 according to another embodiment. The system 400 is adapted to generate a customized schema description of a web service from a predetermined schema description of the web service. The system comprises a portable device 405 and a server 410. The portable device 405 is adapted to communicate with the server 410 via a communication link 415 (such as the internet, for example).

The portable device 405 comprises a schema tailoring tool/program which is adapted to enable a user to select which operations of the web service are to be supported by a tailored schema (to be created by the system). The portable device is adapted to enable a user to provide example XML request and response messages for the selected operation(s).

The portable device 405 is adapted to communicate the user inputted information to the server 410 via the communication link 415.

The server comprises a central processing unit 420 and a data store 425 which stores a schema description of the web service.

The central processing unit 420 of the server 410 is adapted to analyze the user provided information in conjunction with the stored schema description to determine a minimal subset of the schema that is required. The central processing unit 420 then provides the subset of the schema to the portable device 405 (via the communication link 415) as a customized schema.

There is accordingly proposed a simplified approach to generating a tailored schema description of a web service. As an alternative to, or in addition to, supporting a user in editing a schema, the user may indicate a subset of the schema that is required by providing examples of the messages that they might send and receive. This is simple to understand, and it is easy for the user to provide such example messages. Also, because the required message schema is calculated based on the example messages, required message elements will not be omitted from the generated tailored schema.

It will be understood that the proposed embodiments implement a method for generating a custom schema description of a web service from a predefined schema description of the web service. The custom schema may be created by editing the predefined schema to only cater for required operations based on examples of messages that the operation may send and/or receive. This is simple to understand and does not require a user to understand the schema or the interpret elements of the schema. Determining the custom schema based on the example messages can also ensure that schema elements will not be omitted from the custom schema.

In another embodiment, the approach includes generating the tailored schema may comprise editing the predefined schema based on the calculated subset.

In another embodiment, generating the tailored schema may comprise removing elements from the predefined schema which are not in the calculated subset of the predefined schema, and defining the remaining non-removed elements as forming the tailored schema.

In yet another embodiment, calculating a subset of the predefined schema may comprise identifying elements of the at least one example message, and determining, for each identifying message element, one or more associated schema elements of the predefined schema.

In another embodiment, the predefined schema description may comprise a machine-readable definition of the message format.

In yet another embodiment, the machine-readable definition of the message format may be represented in an extensible markup language (XML).

In another embodiment, the machine readable definition may comprise a WSDL document.

Embodiments may be captured in a computer program product for execution on the processor of a computer, e.g. a personal computer or a network server, where the computer program product, if executed on the computer, causes the computer to implement the method according to an embodiment, e.g. the method as shown in FIG. 2. Since implementation of these methods into a computer program product requires routine skill only for a skilled person, such an implementation will not be discussed in further detail for reasons of brevity only.

In an embodiment, the computer program product is stored on a computer-readable medium. Any suitable computer-readable medium, e.g. a CD-ROM, DVD, USB stick, memory card, network-area storage device, internet-accessible data repository, and so on, may be considered.

Various modifications will be apparent to those skilled in the art. Other variations to the disclosed embodiments can be understood and effected by those skilled in the art, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of generating a tailored schema of a web service from a predefined schema of the web service, the predefined schema providing a machine readable description of operations performed by the web service and an Extensible Markup Language (XML) message format for communication with the web service, the method comprising:
   receiving, from an end user, an indication of a particular operation of the web service to be supported by the tailored schema, the particular operation selected by the end user from the operations performed by the web service;
   receiving, from the end user, at least one example XML message that the tailored schema should support for requesting the particular operation;
   determining, based at least in part on the at least one example XML message, a minimal subset of schema elements of the predefined schema required to support the particular operation;
   generating the tailored schema to include only the minimal subset of schema elements of the predefined schema;
   receiving an XML message requesting the particular operation; and
   performing the particular operation using the tailored schema in response to receiving the XML message.

2. The method of claim 1, wherein the generating the tailored schema comprises editing the predefined schema based on the minimal subset of schema elements.

3. The method of claim 1, wherein the generating the tailored schema comprises:
   removing each element from the predefined schema other than the minimal subset of schema elements; and
   defining remaining elements of the predefined schema as forming the tailored schema.

4. The method of claim 1, wherein the determining the minimal subset of schema elements of the predefined schema comprises:
   identifying message elements of the at least one example XML message;
   determining, for each message element of the at least one example XML message, a respective at least one corresponding schema element of the predefined schema; and
   determining that the minimal subset of schema elements comprises each respective at least one corresponding schema element.

5. The method of claim 1, wherein the predefined schema comprises a machine-readable definition of the XML message format.

6. The method of claim 5, wherein the machine readable definition comprises a Web Service Description Language (WSDL) document.

7. A computer program product for generating a tailored schema of a web service from a predefined schema of the web service, the predefined schema providing a machine readable description of operations performed by the web service and an Extensible Markup Language (XML) message format for communication with the web service, wherein the computer program product comprises:
   a non-transitory computer-readable storage medium having computer-readable program code embodied therewith, the computer-readable program code configured to perform the method of:
   receiving, from an end user, an indication of a particular operation of the web service to be supported by the tailored schema, the particular operation selected by the end user from the operations performed by the web service;
   receiving, from the end user, at least one example XML message that the tailored schema should support for requesting the particular operation;
   determining, based at least in part on the at least one example XML message, a minimal subset of schema elements of the predefined schema required to support the particular operation;
   generating the tailored schema to include only the minimal subset of schema elements of the predefined schema;
   receiving an XML message requesting the particular operation; and
   performing the particular operation using the tailored schema in response to receiving the XML message.

8. The computer program product of claim 7, wherein generating the tailored schema comprises editing the predefined schema based on the minimal subset of schema elements.

9. The computer program product of claim 7, wherein the generating the tailored schema comprises:
   removing each element from the predefined schema other than the minimal subset of schema elements; and
   defining remaining elements of the predefined schema as forming the tailored schema.

10. The computer program product of claim 7, wherein the determining the minimal subset of schema elements of the predefined schema comprises:
    identifying message elements of the at least one example XML message;
    determining, for each message element of the at least one example XML message, a respective at least one corresponding schema element of the predefined schema; and
    determining that the minimal subset of schema elements comprises each respective at least one corresponding schema element.

11. The computer program product of claim 7, wherein the predefined schema comprises a machine-readable definition of the XML message format.

12. The computer program product of claim 11, wherein the machine readable definition comprises a Web Service Description Language (WSDL) document.

13. A computer system adapted to generate a tailored schema of a web service from a predefined schema of the web service, the predefined schema providing a machine readable description of operations performed by the web service and a message format for communication with the web service, the system comprising:
   one or more processors configured to perform a method comprising:
   receiving, from an end user, an indication of a particular operation of the web service to be supported by the tailored schema, the particular operation selected by the end user from the operations performed by the web service;
   receiving, from the end user, at least one example XML message that the tailored schema should support for requesting the particular operation;

determining, based at least in part on the at least one example XML message, a minimal subset of schema elements of the predefined schema required to support the particular operation;

generating the tailored schema to include only the minimal subset of schema elements of the predefined schema;

receiving an XML message requesting the particular operation; and performing the particular operation using the tailored schema in response to receiving the XML message.

14. The computer system of claim 13, wherein the generating the tailored schema comprises editing the predefined schema based on the minimal subset of schema elements.

15. The computer system of claim 13, wherein the generating the tailored schema comprises:

removing each element from the predefined schema other than the minimal subset of schema elements; and defining remaining elements of the predefined schema as forming the tailored schema.

16. The computer system of claim 13, wherein the determining the minimal subset of schema elements of the predefined schema comprises:

identifying message elements of the at least one example XML message;

determining, for each message element of the at least one example XML message, a respective at least one corresponding schema element of the predefined schema; and determining that the minimal subset of schema elements comprises each respective at least one corresponding schema element.

17. The computer system of claim 13, wherein the predefined schema comprises a machine-readable definition of the XML message format.

* * * * *